United States Patent
Ezell

(12)
(10) Patent No.: US 6,226,876 B1
(45) Date of Patent: May 8, 2001

(54) DEBRIS SHIELD FOR HAND-HELD STRING TRIMMER

(76) Inventor: Thomas E. Ezell, 8471 Hwy. 72 West, Athens, AL (US) 35611

( * ) Notice: Subject to any disclaimer, the term of this patent is extended or adjusted under 35 U.S.C. 154(b) by 0 days.

(21) Appl. No.: 09/373,669

(22) Filed: Aug. 13, 1999

Related U.S. Application Data

(60) Provisional application No. 60/096,416, filed on Aug. 13, 1998.

(51) Int. Cl.[7] .................................................. A01D 34/10
(52) U.S. Cl. ................................................. 30/276; 30/347
(58) Field of Search ........................... 30/276, 347, 286; 56/12.5, 12.7

(56) References Cited

U.S. PATENT DOCUMENTS

| | | |
|---|---|---|
| 4,702,005 * | 10/1987 | Pittinger et al. ........................ 30/276 |
| 5,524,349 * | 6/1996 | Dolin ..................................... 30/276 |

* cited by examiner

*Primary Examiner*—Douglas D. Watts
(74) *Attorney, Agent, or Firm*—Mark Clodfelter

(57) ABSTRACT

Multiple embodiments of a string trimmer debris shield are disclosed. In one embodiment, an L-shaped bracket having a clamp at one end is fitted to a string trimmer so that the bracket may be located to either side of a string head of the trimmer and either above or below a mounting point of the bracket. The bracket is mounted to the shaft near the rotating string, and supports a debris shield between a side of the string head from which debris is shown and legs and feet of a user. In another embodiment the bracket extends horizontally straight from the shaft to either side of the trimmer, and supports a debris shield. In a third embodiment the bracket is mounted to a shaft of a string trimmer and supports a perpendicular debris shield support member which in turn supports a debris shield on a side of the string head from which debris is thrown toward the user. In this embodiment, the debris shield may be rotated about the shaft to either side of the trimmer.

7 Claims, 3 Drawing Sheets

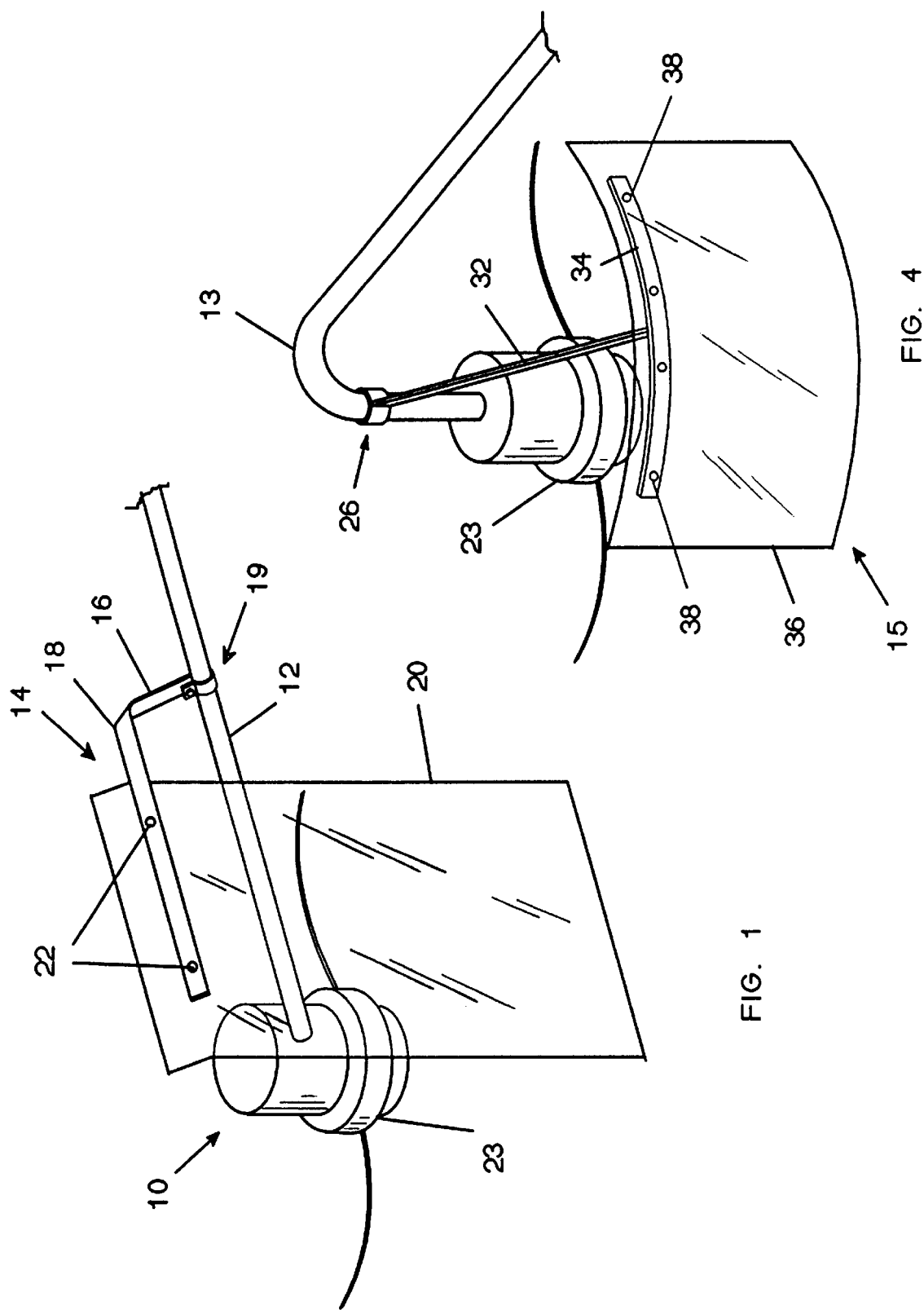

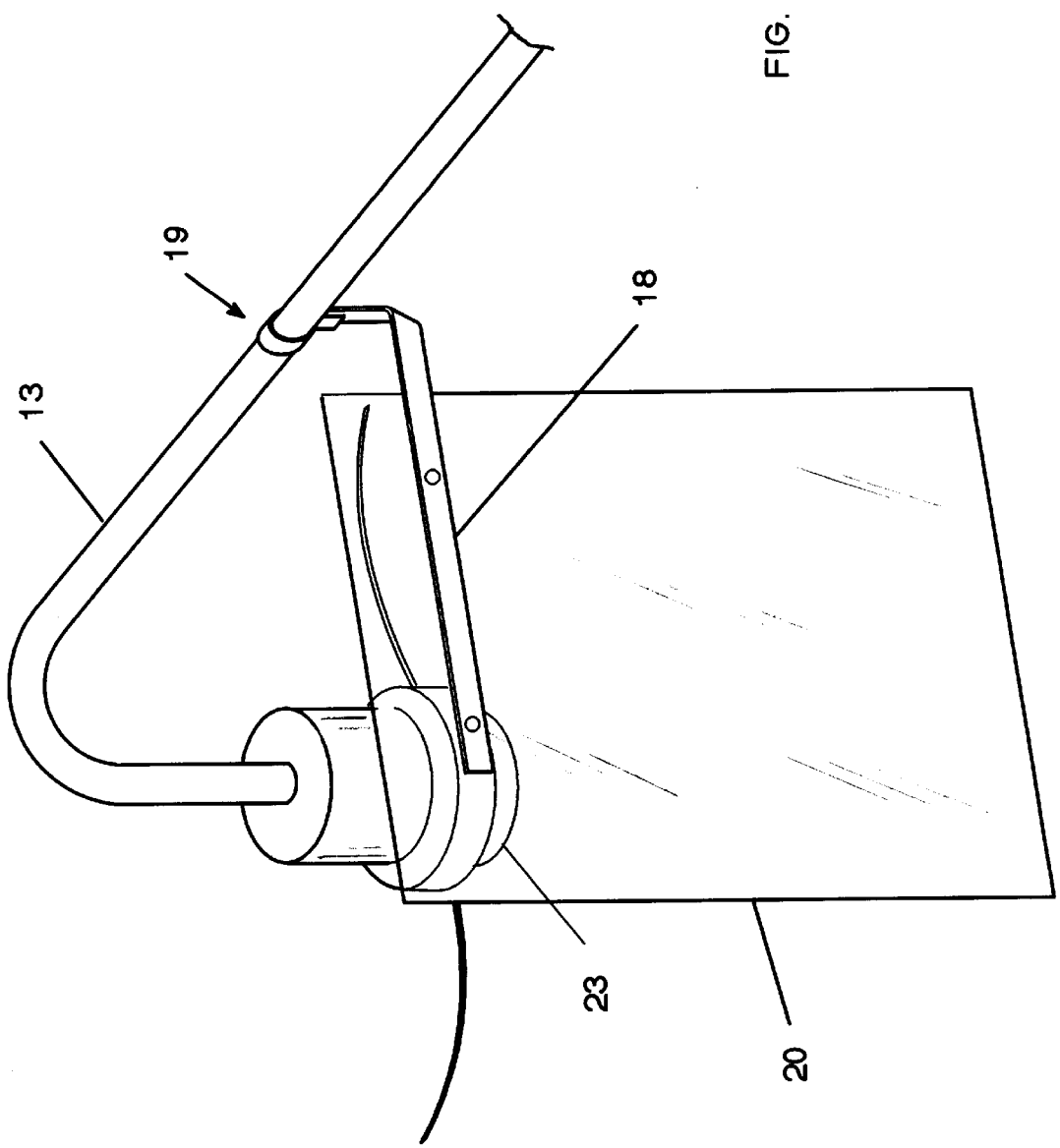

DEBRIS SHIELD FOR HAND-HELD STRING TRIMMER

CROSS REFERENCE TO RELATED APPLICATION

This application is a continuing application of provisional patent application Ser. No. 60/096,416, filed Aug. 13, 1998.

FIELD OF THE INVENTION

This invention relates to debris shields for blocking debris thrown by rotating cutters, and particularly to a debris shield mounted to a string trimmer on a side of the trimmer from which cutting debris is thrown toward legs and feet of a user.

BACKGROUND OF THE INVENTION

Disclosed in this application is a debris shield or barrier adapted to be fitted to a shaft of a hand-held string trimmer, and which functions to block grass, weed and other debris developed from operation of the string trimmer from being thrown onto legs and feet of an individual using the string trimmer.

Cutting grass and weeds with a string trimmer can be a messy operation, particularly in areas where weeds and grass are overgrown. Typically, after using a string trimmer for any length of time, an individual's lower legs and feet become coated with cuttings from the vegetation being trimmed. Additionally, as a string trimmer operates to basically beat vegetation to pieces instead of neatly cutting it with a blade, fleshy and sappy vegetation cut with a string trimmer develops cuttings that are damp and sticky and which form a coating that must be washed off skin and may permanently stain clothes. Additionally, during operation of the trimmer, the operator will typically need to feed string that breaks off from the head of the trimmer. In most trimmers, this feed operation is accomplished by bumping the lower portion of the trimmer against the ground or other surface. A blade mounted to a string guard then cuts off any excess length of string, which may strike the user. Applicant's debris shield also blocks these cut or broken pieces of cutting string.

While most string trimmers are provided with a small, relatively flat string guard that encircles a rearward portion of the arc encompassed by the string, these guards do little to nothing to prevent cuttings from being thrown toward the user, and serve mainly for the mounting of the small knife for trimming excess lengths of string. Additionally, these guards may to some extent prevent a user from inadvertently causing the rotating string from coming into contact with legs or feet of the user.

Accordingly, it is one object of the invention to provide a debris shield mountable to one side of the head of a string trimmer that serves to block debris from being thrown back toward legs and feet of a user. Other important objects will become apparent upon a reading of the following specification.

SUMMARY OF THE INVENTION

A debris shield for a string trimmer is disclosed, the debris shield having a bracket mounted to a shaft of the string trimmer near a string head thereof. The bracket is positioned or mounted to the shaft on a side of the shaft where rotation of the strings throw debris toward legs and feet of a user of the string trimmer. A debris shield is mounted to the bracket so as to support a debris shield that extends outward generally from the shaft to a point near an end of the bracket. The debris shield also extends downward to the ground so that an area behind the debris shield is protected from debris thrown by the strings.

BRIEF DESCRIPTION OF THE DRAWINGS

FIG. 1 is a perspective view of one embodiment of my debris shield shown attached to a shaft of a string trimmer.

FIG. 3 is a perspective view of the debris shield shown in FIG. 1 with a support bracket thereof mounted in an inverted position in order to accommodate a string trimmer having a bent shaft.

FIG. 4 is yet another embodiment of my string trimmer shown attached to a trimmer having a bent shaft.

DETAILED DESCRIPTION OF THE DRAWINGS

Figure 5:
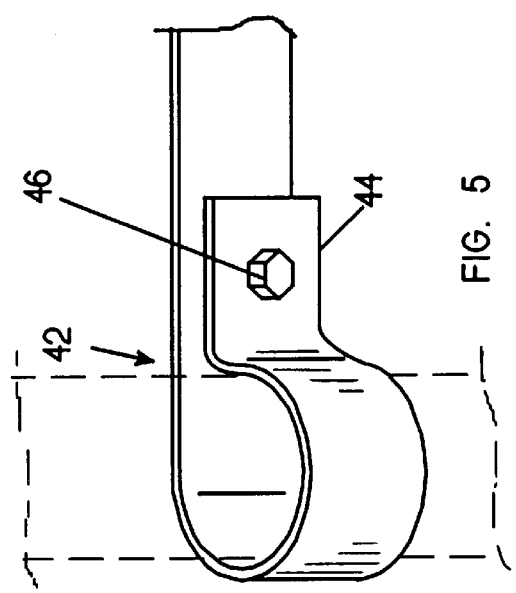
FIGS. 5 and 6 show construction particulars related to mounting details of the debris shields to string trimmer shafts.

Referring initially to FIG. 1, a string trimmer head portion 10 of a string trimmer is shown. In this type trimmer, head 10 is mounted to a straight shaft 12, as is found on a number of commercially available trimmers. A debris shield 14 is mounted to shaft 12, and is constructed in this embodiment having an upwardly extending portion 16 that raises the shield to a sufficient height so as to prevent cuttings from being thrown over the shield. A horizontally extending arm 18 is fastened as shown by a clamp portion 19 to shaft 12, arm 18 extending between a side of head 10 from which cuttings are thrown and legs and feet of the user. Arm 18 supports a shield or barrier 20, as by fasteners 22, in upright relation during use of the trimmer. Here, shield 20 is of a vertical length so as to generally contact a ground surface during use to prevent cuttings from being thrown from underneath the shield onto feet of a user, and is sufficiently wide so as to develop a protected area on a side of the trimmer where the strings rotate toward legs and feet of the user. Shield 20 may be constructed of a thick, transparent plastic sheet material, such as that used in construction of hanging strip heat transference barriers used to cover door openings in warehouses, and which is fairly flexible. Otherwise, shield 20 may be constructed of any other durable material, which may also be a stiff fabric, so as to present a barrier to cuttings thrown by the trimmer.

As direction of rotation of the string hub 23 is different on different models of string trimmers, thus throwing cuttings toward legs of a user on one side or the other of string hub 23, debris shield 14 may be mounted so that shield 20 is on either side of shaft 12. As such, the shield may be mounted to shaft 12 as shown in FIG. 1, or mounted so that shield 20 is on the other side of shaft 12 simply by reversing the shield and mounting the shield on the other side of shaft 12.

Figure 2:
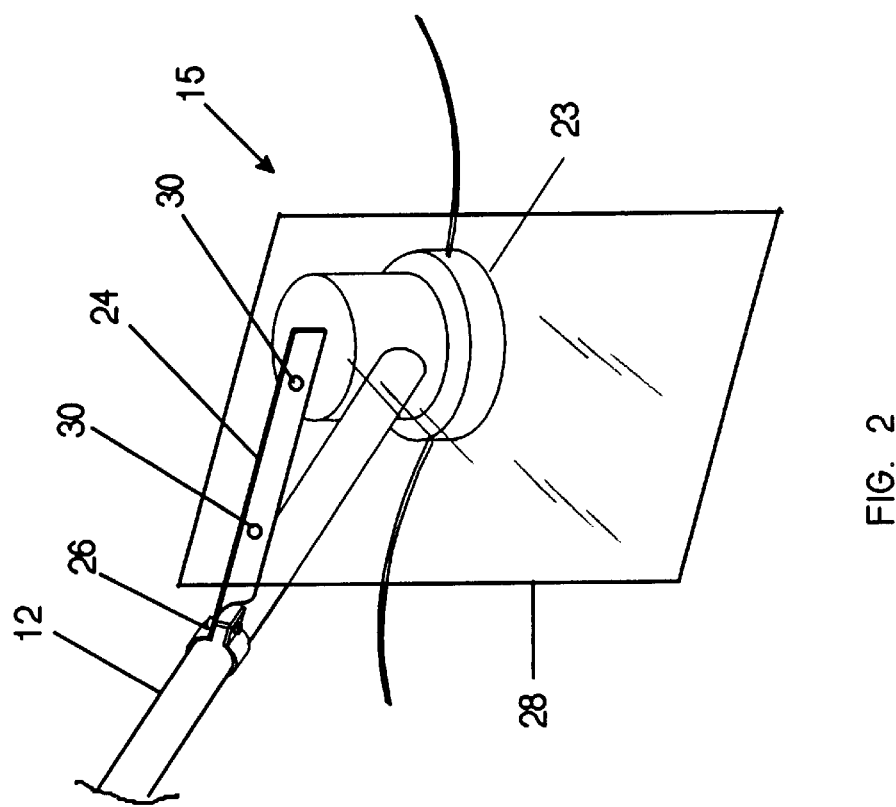
FIG. 2 is a perspective view of another embodiment of my debris shield shown attached to a shaft of a string trimmer.

In another embodiment of the invention fitted to a string trimmer having a straight shaft 12, and referring to FIG. 2, a debris shield 15 is shown mounted by a bracket 24 having a clamp portion 26 so that the bracket extends in generally horizontal relation to one side or the other of the trimmer during use. Bracket 24 may be twisted slightly as shown at clamp portion 26 so that a plane of bracket 24 is generally vertical during use, or constructed without a twist so that the plane of bracket 24 is angled slightly from the vertical. In either case, a shield 28 hangs vertically from bracket 24. Shield 28, constructed generally as described above, is mounted to bracket 24 by fasteners 30, which may be screws or nuts and bolts, which fasteners may be removable so as to remove and reverse the position of shield 28 in the event the shield is to be mounted on the opposite side of shaft 12.

Referring now to FIG. 3, the embodiment of the invention as shown in FIG. 1 is shown fitted to a string trimmer having a curved shaft 13. Here, bracket portion 18 having clamp portion 19 thereon is mounted to shaft 13 of the trimmer at a point so that shield 20 hangs to a side of hub 23 where cuttings thrown by the trimmer are blocked. As with the trimmer shown in FIG. 1, i.e. with a straight shaft, the debris shield shown in FIG. 3 may be reversed and mounted on the opposite side of shaft 13 to block cuttings in the event rotation of hub 23 is in an opposite direction to that shown in FIG. 3.

In another embodiment of the invention preferably intended to be fitted to a trimmer having a curved shaft, but which may be adapted to fit a trimmer having a straight shaft, reference is made to FIG. 4. Here, a bracket 32 is mounted to a portion of shaft 13 emerging generally perpendicular to the plane of rotation of the string. A support 34 may be centrally mounted, as by welding or by means of fasteners, to the end of bracket 32 so that bracket 32 and support 34 are generally in a T-shaped configuration. Support 34 may also be contoured as shown in a concentric arc outside a circle described by the string, or support 34 may be configured so as to be straight. A transparent debris shield 36 as described for shield 20 is mounted by fasteners 38 to support 34 so that during use shield 36 hangs between one side of the string trimmer head and legs and feet of a user to which cuttings are thrown. As with shield 20 (FIG. 1) shield 30 hangs a sufficient distance so as to contact the ground during use, and extends to a height so that cuttings are not thrown over the top of shield 36.

For positioning shield 36 on one side or the other of string hub 23, clamp portion 26 may be loosened so that shield 36 may be rotated about clamp portion 26 to the appropriate side of the string head so as to block cuttings from that particular side. Also, if needed, bracket 32 may be constructed so that it is inclined upwardly in order to support shield 30 a sufficient height above string hub 23.

At least two types of clamps that may be used to clamp the various embodiments of the debris shield described above to a string trimmer shaft are shown in FIGS. 5 and 6. In FIG. 5, a unitary clamp 42 is constructed simply by bending an end of the bracket around a diameter sized so as to accommodate a shaft of a trimmer (dashed lines) and forming a tab 44 on the end of the bracket. A bolt, screw or other fastener 46 is inserted through aligned openings drilled in tab 44 and an opposite side of the bracket, the bolt or screw used to tighten clamp 42 on the string trimmer shaft.

Figure 6:
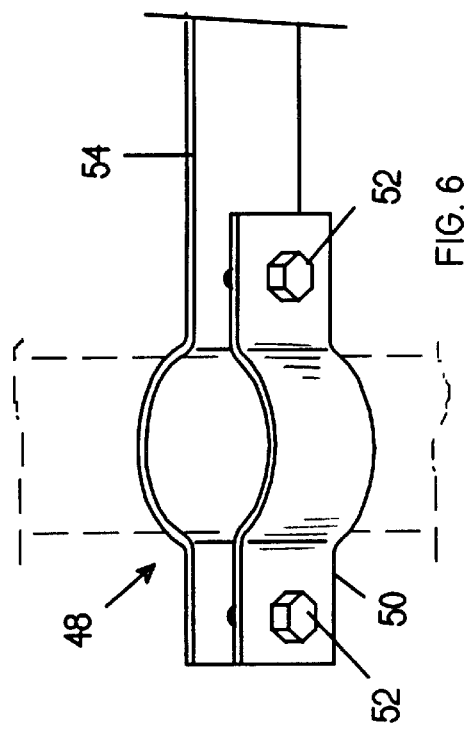

FIG. 6 shows a two-piece clamp 48 constructed having a separate clamp portion 50 provided with two openings through which screws or bolts 52 are inserted, with corresponding openings provided in a bracket 54. Clamp portion 50 and bracket 54 are each configured with matching portions of an arc-shaped region through which a shaft of a string trimmer (dashed lines) is inserted. With this construction, when fasteners 52 are tightened, the clamp is pulled tight against the shaft of the string trimmer.

Having thus described my invention and the manner of its use, it should be apparent that modifications may be made thereto that fairly fall within the scope of the following appended claims, wherein I claim:

1. A debris shield assembly mountable to a generally vertical shaft portion extending from a head of a string trimmer, said debris shield assembly functioning to block vegetation cuttings and other debris resulting from operation of the string trimmer, said debris shield assembly comprising:
   a bracket mounted to said generally vertical shaft portion of said string trimmer, said bracket extending to a rear and to one side of said head of said string trimmer so that when said string trimmer is in use, said bracket is generally in a horizontal plane and positioned only to a one side of said string trimmer where debris is thrown toward a user,
   A contiguous debris shield mounted to said bracket for blocking said debris from legs and feet of the user, said debris shield extending downward from said bracket generally to a ground surface when said string trimmer is in use.

2. A debris shield as set forth in claim 1 wherein said bracket is adjustable rotatable about said upwardly extending portion of said shaft so that said debris shield is rotatable about a circumference of said rotating string, enabling said debris shield to be positionable on said side of said string trimmer from which said debris is thrown.

3. A grass and weed cutting system comprising:
   a portable, hand-held string trimmer having a shaft, and a string head attached to said shaft, with at least two vegetation cutting strings attached to said string head, said string head disposed for powered rotation in order to rapidly rotate said strings in a plane of rotation positionable to cut said weeds and grass,
   an elongated, L-shaped bracket mountable either above or below said shaft and to one side or the other of said shaft near said string head so that said bracket may be oriented between legs and feet of a user and a portion of said plane of rotation of said strings that throws debris toward a user,
   a debris shield attached to said bracket, said debris shield extending horizontally from a point near said shaft to a point near an outer end of said bracket, said debris shield further extending downward from said bracket generally to a ground surface so that said debris shield blocks debris on a one side of said string head where said strings are rotating toward legs and feet of a user, blocking debris thrown from said one side of said string head from impinging on legs and feet of a user.

4. A grass and weed cutting system as set forth in claim 1 wherein said string trimmer is provided with a curved shaft so as to form said generally vertical shaft portion, and said bracket is attachable to said generally vertical shaft portion near said string head so that said bracket is positionable in a plane generally above said plane of rotation, said bracket further provided with a generally perpendicular debris shield support member with said debris shield mounted to said debris shield support member, whereby said bracket may extend toward a user to support said debris shield between a one side of said string trimmer from which debris is thrown toward legs and feet of a user.

5. A vegetation cutting system comprising:
   a string trimmer having a cutting head mounted to a straight portion of a shaft extending vertically from said cutting head, said cutting head rotatably supporting at least two strings that rotate in a cutting plane of rotation to cut vegetation, and a debris shield comprising:
   a mounting bracket having a clamp portion at one end, said clamp portion clampably mounting the bracket to said shaft of said string trimmer, said bracket mountable by said clamp portion to said straight portion of said shaft and extending to a rear and to one side of said straight portion of said shaft and terminating at a point between legs and feet of a user and said plane of rotation of said cutting strings wherein said cutting strings are rotating toward said legs and feet of a user, a debris shield support member mounted to an end of said bracket opposite said clamp, said debris shield support member being generally centered on and generally perpendicular to said bracket, and a contiguous, flexible, transparent debris shield mounted to said debris shield support member and extending generally the length thereof, said debris shield further extending downward at least to a ground surface when in use, so that debris thrown toward legs and feet of a user by said cutting strings rotating toward legs and feet of a user.

6. A cutting system as set forth in claim 3 further comprising a clamp on a short side of said L-shaped bracket for clamping said bracket to said shaft, and said debris shield is a contiguous, flexible, transparent debris shield mounted along a length of a long side of said L-shaped bracket, and said bracket is mountable to said shaft so that said long side of said L-shaped bracket may extend either above or below said shaft, and to one side or an opposite side of said shaft, allowing said bracket and said debris shield to be mounted to different configurations of string trimmers.

7. A grass and weed cutting system comprising:

a portable, hand-held string trimmer having a curved shaft so that said shaft adjacent said string head is generally vertical with respect to a ground surface, and a string head attached to said shaft, with at least two vegetation cutting strings attached to said string head, said string head disposed for rotation in order to rapidly rotate said strings in a plane of rotation positionable to cut said weeds and grass, an elongated bracket mounted to the generally vertical portion of said shaft near said string head, said bracket positionable in a plane generally above said plane of rotation and to one side of said string head so that said bracket is oriented between legs and feet of a user and a portion of said plane of rotation of said strings that throws debris toward a user, a debris shield support member mounted to an end of said bracket opposite said shaft, said support member generally perpendicular to said bracket, a debris shield mounted to said debris shield support member, whereby said bracket may be positioned to generally extend toward a user to support said debris shield between a one side of said string trimmer from which debris is thrown and legs and feet of a user.

* * * * *